UNITED STATES PATENT OFFICE.

JESSE ANDERSON ASHBURN, OF WINSTON SALEM, NORTH CAROLINA.

FLAVORING COMPOUND FOR TOBACCO.

981,605.　　　　　Specification of Letters Patent.　　Patented Jan. 17, 1911.

No Drawing.　　Application filed April 19, 1910.　Serial No. 556,405.

*To all whom it may concern:*

Be it known that I, JESSE A. ASHBURN, a citizen of the United States, residing in Winston Salem, in the county of Forsyth and State of North Carolina, have invented certain new and useful Improvements in Flavoring Compounds for Tobacco, of which the following is a specification.

According to my invention, I flavor tobacco with a compound made by fermenting raw apple juice and sugar and preferably adding other fruit flavors. I preferably mix raw apple juice and sugar in the proportions of from 2 to 4 pounds of sugar to each gallon of apple juice and allow the same to stand and ferment for about four or five months, when it is ready for use as a flavoring in the usual way for tobacco while in the leaf. If desired, other fruit flavors may be added, such as peaches, but the essential feature of my invention is the use of fermented raw apple juice and sugar. Such flavoring has been used by me and is found to give the tobacco a most pleasing and agreeable flavor.

This compound consists of crude undistilled apple juice and sugar which are fermented, and the apple juice after fermentation may be blended with other fruit flavoring.

I claim:

1. A flavoring for tobacco while in the leaf, consisting of apple juice and sugar fermented and aged, substantially as described.

2. A flavoring for tobacco while in the leaf, consisting of apple juice and sugar in the proportions of from 2 to 4 pounds of sugar to 1 gallon of apple juice, fermented and aged, substantially as described.

3. A flavoring for tobacco while in the leaf, consisting of sugar and apple juice mixed in substantially the proportions described, fermented, aged and blended with other fruit flavoring.

In testimony whereof, I have hereunto subscribed my name.

JESSE ANDERSON ASHBURN.

Witnesses:
FRED SHEETZ,
C. S. STARBUCK.